Patented Jan. 4, 1927.

1,613,561

UNITED STATES PATENT OFFICE.

CARLETON ELLIS, OF MONTCLAIR, NEW JERSEY.

ETHYL ALCOHOL PAINT AND VARNISH REMOVER.

No Drawing.  Application filed December 21, 1923. Serial No. 682,066.

This invention relates to a composition for softening paint and varnish coatings for the purpose of their removal and relates especially to a composition containing absolute or anhydrous ethyl alcohol as a preferred or essential constituent.

A popular form of paint and varnish remover in extensive commercial use is composed of benzol and methyl acetone with from 3 to 5 ounces of paraffin wax per gallon. The proportion of the benzol to the methyl acetone varies but when used in equal parts afford an effective removing composition applicable to most classes of work.

As is well known methyl acetone is a distillate obtained in the rectification of crude wood alcohol. Like most solvents from wood distillation the market price fluctuates greatly with supply and demand.

In the present invention one object is to make use of a solvent having greater price stability than solvents obtained from the wood alcohol industry. Absolute or substantially anhydrous ethyl alcohol is serviceable for this purpose. In paint and varnish removing compositions it does not have the same degree of solvent action or "cutting speed", to use a term employed in the paint removing industry, but its solvent action is better than ordinary wet denatured alcohol and its degree of miscibility is better for some purposes.

In preparing a remover which will be effective for most classes of paint and varnish coatings there is need of a wax solvent preferably benzol. Other hydrocarbon solvents for waxes such as toluol or xylol, solvent naphtha and the like may be used but benzol is more satisfactory on account of its higher penetrating powers and co-operative action with anhydrous ethyl alcohol. As a waxy constituent to form a film on exposure and thus retard evaporation, paraffin and ceresin waxes, that is the mineral waxes, are much better than most of the vegetable waxes. Paraffin wax is best for use in making what are known as liquid removers and ceresin wax, owing to its amorphous qualities, is preferable when making removers having a creamy or paste-like consistency.

Thickening agents which serve as protective colloids for the wax, enabling it to retain a high degree of gelatinization, are pyroxylin or nitrocellulose compounds, cellulose acetate and the like. If the removing composition also is to contain a caustic alkali such cellulose esters should be omitted for they are as a rule incompatible with alkali. In Serial No. 556,827 filed April 27, 1922, describing a baked enamel remover I have set forth the use of caustic alkali, together with anhydrous solvents of the character claimed herein.

In preparing such a baked enamel remover employing benzol and wet ethyl or denatured alcohol as the solvent mixture, I may dry the composition by adding metallic sodium. When the composition is to be used as a baked enamel remover to take coatings of this character off of automobile bodies or other steel construction the presence of the caustic alkali formed is of advantage in removing such coatings and has no injurious effect on the steel support. If on the other hand the composition is to be used to remove paint or varnish from wood the alkali is objectionable and preferably should be wholly or partly neutralized by the addition of an appropriate acid anhydride.

Other drying agents may be employed to advantage as for example calcium carbide, especially to simultaneously dry the mixture of benzol and ordinary wet denatured alcohol. The lime residues may be removed by filtration. The ethyl alcohol may be separately dried or preferably dried after admixture with benzol or other wax solvent. Since benzol can retain a comparatively small amount of water it appears drying may be carried on advantageously by first mixing the wet alcohol with benzol and then adding a drying agent thus securing a co-drying effect. The benzol thus aids in the expulsion of the moisture from the alcohol and its combination with the drying agent.

It should be noted that the solvents employed in the present removing composition exert their best effect only when chosen with reference to complete miscibility. It is known of course that alcohol containing more than a certain proportion of water will not mix with benzol or in any event some separation occurs. On the other hand when the solvents are completely dry the highest degree of miscibility is attained. Under such conditions the co-operating effect, that is the joint penetrating and loosening action desired in such composite solvents apparently reaches its maximum. Intermediate stages of moisture content may affect the degree of miscibility, not necessarily in a manner apparent to the eye, but in some way which seemingly tends to reduce the co-operative effect of the solvents conducive to most effective and rapid cutting action. By using anhydrous ethyl alcohol and especially by employing the preferred form of this invention of co-drying the solvents the highest degree of miscibility results.

The present invention is based on the astonishing fact, discovered by me, that an anhydrous mixture of benzol and alcohol (say in equal volumes), containing a small amount of wax, is about 30% more active, as a paint and varnish remover than is a precisely similar mixture made up with benzol, wax and the same proportion of ethyl alcohol of about 90% strength, and not rendered anhydrous. This increase in activity is important and unexpected.

In the case of solvent mixtures which are apparently miscible, but which by virtue of some incompatible element are in a state of pseudo-miscibility slight disturbing influences may bring about separation of all or a part of one solvent from the remainder of the composition with a notable impairment of activity of the removing composition. Thus for example, in making organic solvent mixtures containing caustic alkali particularly for the purpose of producing a remover effective in the stripping of baked japan coatings, the observation has been made that ordinary methyl alcohol saturated with the caustic alkali does not mix with benzol. On the other hand methyl alcohol treated with metallic sodium yields an alkaline solution which does mix with benzol. The addition of wax however causes separation.

In a similar manner compositions which are pseudo-miscible may, on exposure, when the remover is applied to a varnished surface, absorb moisture and separation occur or the composition may be affected by the solution of some of the constituents of the paint and varnish coating which is undergoing removal and the condition of pseudo-miscibility may bring about actual separation of the solvents and consequent impairment of the cutting speed.

In a removing composition of an alkaline character one should avoid introducing such auxiliary solvents as chlorinated hydrocarbons, including carbon tetrachloride and trichlorethylene. These solvents are useful in reducing the inflammability of the composition but react with alkali to a greater or lesser extent causing the removing composition to change in composition on standing. In fact in the present composition whether alkaline, neutral or of acid reaction the preferred embodiment is constituted of solvents which contain no carbon tetrachloride, trichlorethylene, chloroform or similar chlorinated solvents. It is an object in the present composition to approximate as closely as possible in cutting speed to that exhibited by the benzol-methyl acetone removing composition referred to above. Carbon tetrachloride for example has relatively low solvent action in comparison with benzol and such chlorinated solvent therefore should not form any substantial part of the preferred removing composition. In fact the composition prepared hereunder in its preferred form has inflammable qualities. Another series of substances or compounds which should be absent in the preferred form of composition includes soaps, aqua ammonia, and mineral salts such as calcium chloride or magnesium chloride which combine with alcohol to form crystalline compounds.

In fact I prefer to use as the sole solvents benzol, anhydrous ethyl alcohol and mineral wax with or without the addition of acetone or methyl acetone containing a comparatively small proportion, if any, of water. The wax is preferably paraffin or ceresin wax as noted, the proportion of wax being ordinarily not over 4 or 5 per cent. Deviations from this formula which do not greatly alter its activity are: (1) replacement of part of the benzol by toluol or even xylol, the heavy aromatic hydrocarbon solvents are however not as useful; (2) replacement of part of the ethyl alcohol by well-dried acetone or methyl acetone. Thus a composition may be made from equal parts of benzol and absolute ethyl alcohol with which is incorporated about 5 per cent of paraffin wax per gallon, or 2 volumes of benzol may be mixed with 1 volume each of ethyl alcohol and methyl acetone. The mixture is well dried and incorporated with 4 or 5 per cent of paraffin or ceresin wax by heating.

In making a composition containing co-dried solvents it should be borne in mind that methyl acetone usually contains some methyl acetate and drying with sodium may bring about saponification of this ester. It is recommended when alkaline agents are used for dehydration that methyl acetone be dried in some other manner than by the use of drying agents having the power of saponification.

The addition of some methyl acetone for example 10 to 20 per cent of the total volume of the solvents employed aids considerably in overcoming the somewhat slower cutting action due to the use of ethyl alcohol in place of acetone. The present invention therefore contemplates the activation of benzol-ethyl alcohol removing composition by the addition of acetone or methyl acetone of low water content or preferably anhydrous.

Methyl or ethyl acetate have a moderate solvent action for wax and may be used to replace benzol either partially or completely. Thus 5 to 15 per cent of anhydrous ethyl acetate may be added to any of the foregoing compositions. A removing composition may be made from for example equal parts of anhydrous ethyl acetate and anhydrous ethyl alcohol with which is incorporated 1 or 2 per cent of paraffin wax and in some cases a like amount of nitrocellulose or celluloid.

Still other solvents such as ethyl formate, methylal and acetal, methyl alcohol, methyl ethyl ketone and the like may be used as additions or supplemental solvents if employed in the scope and purposes of the present invention as herein set forth. Heavy solvents such as amyl acetate, butyl alcohol, ethyl carbonate, diacetone alcohol and the like may be added in some cases but are not desired in the preferred form. I refer herein especially to ethyl alcohol as the preferred alcoholic body to be used. Methyl alcohol and denatured alcohol are more particularly described and included in the claims of my co-pending application 680,281 filed December 12, 1923.

Any large proportion of nitrocellulose is generally not desirable on account of the viscosity imparted to the composition. The wax content preferably is low in order to secure the maximum percentage of actual solvents and the greatest degree of fluidity and penetrating qualities. The solvent effect of these removing compositions is greatly affected by increased viscosity. In most cases there is desired for commercial purposes a composition which is capable of softening all classes of varnish coatings such as painted surfaces, oil varnishes, shellac or spirit varnishes, nitrocellulose coatings, enamel coatings of various descriptions and the like. Thin coatings made from cheap rosin varnishes are very easily removed by solvent mixtures containing water. In other cases the anhydrous qualities of the removing composition described herein come to the fore and render valuable the invention described herein because of its general degree of applicability.

In several of my prior patents relating to paint and varnish removers I have used the term "substantially non-aqueous solvents" meaning solvents of the organic type but not necessarily free from water; the term being used rather to indicate that the composition was not made up of aqueous agents such as solutions of caustic soda in water and the like. In the present application the term "substantially anhydrous" is employed to indicate a special or definite degree of dehydration and to distinguish from the term "substantially non-aqueous solvents". Ethyl alcohol in the form of ordinary denatured alcohol is of about 95 per cent strength. Such ethyl alcohol may be expressed as a "substantially non-aqueous solvent" but it is not "substantially anhydrous". A degree of water elimination corresponding to about 99 per cent or preferably at least 99½ per cent is desired in removing composition falling within the preferred embodiment of the present invention. In other words there is desired a composition having that degree of miscibility and mobility resulting from the employment of commercially anhydrous solvents.

No claim is made herein to remover compositions containing considerable quantities of ordinary phenol or other similar simple phenolic bodies (homologues of ordinary phenol) the use of such bodies being covered in my Patent No. 1,328,080, Jan. 13, 1920, and the use of substantially dry liquid solvents being disclosed in conjunction therewith for preventing action of the phenols upon the skin of the user.

What I claim is:—

1. A paint and varnish removing composition comprising a substantially anhydrous mixture of ethyl alcohol and benzol incorporated with wax, such composition being substantially free from simple phenols.

2. A substantially anhydrous paint and varnish removing composition consisting of a few per cent of wax incorporated with a liquid wax solvent and substantially anhydrous ethyl alcohol, such composition being substantially free from phenols.

3. A substantially anhydrous paint and varnish removing composition comprising wax, benzol, substantially anhydrous ethyl alcohol and methyl acetone.

4. A substantially anhydrous paint and varnish removing composition comprising approximately two volumes of benzol, one volume of substantially anhydrous ethyl alcohol and one volume of a third solvent which is substantially anhydrous, incorporated with a few per cent of wax; said composition being substantially free from chlorinated hydrocarbons, phenols, ammonia and such mineral salts as would combine with the alcohol to form crystalline compounds.

5. A substantially anhydrous mixture of an alcohol containing a large percentage of ethyl alcohol, and a volatile aromatic hydrocarbon solvent, and a wax, such composition being substantially free from phenols, and being of a substantially homogeneous character.

6. A substantially anhydrous paint and varnish removing composition comprising a few per cent of wax admixed with a quantity of substantially dry benzol, substantially anhydrous ethyl alcohol, together with a substantially smaller amount of co-operating solvent.

CARLETON ELLIS.